(12) United States Patent
Nummela

(10) Patent No.: US 12,333,370 B2
(45) Date of Patent: Jun. 17, 2025

(54) METHOD FOR TAGGING PRODUCTS AND A PRODUCT

(71) Applicant: Intelligent Fridges B.V., Nieuw-Vennep (NL)

(72) Inventor: Jussi Nummela, Espoo (FI)

(73) Assignee: Intelligent Fridges B.V., Nieuw-Vennep (NL)

( * ) Notice: Subject to any disclaimer, the term of this patent is extended or adjusted under 35 U.S.C. 154(b) by 0 days.

(21) Appl. No.: 18/275,756

(22) PCT Filed: Feb. 1, 2022

(86) PCT No.: PCT/FI2022/050061
§ 371 (c)(1),
(2) Date: Aug. 3, 2023

(87) PCT Pub. No.: WO2022/167722
PCT Pub. Date: Aug. 11, 2022

(65) Prior Publication Data
US 2024/0104332 A1 Mar. 28, 2024

(30) Foreign Application Priority Data
Feb. 4, 2021 (FI) .................................. 20215118

(51) Int. Cl.
*B65C 9/24* (2006.01)
*G06K 19/077* (2006.01)

(52) U.S. Cl.
CPC ............ *G06K 19/0776* (2013.01); *B65C 9/24* (2013.01)

(58) Field of Classification Search
USPC .......................................................... 53/415
See application file for complete search history.

(56) References Cited

U.S. PATENT DOCUMENTS 5,137,596 A * 8/1992 Potter ....................... B65C 3/16
156/499
2006/0032591 A1* 2/2006 Van Der Burg ...... B65C 9/2208
156/569

(Continued)

FOREIGN PATENT DOCUMENTS

EP 1145962 A1 10/2001
EP 1621466 A1 2/2006

(Continued)

OTHER PUBLICATIONS

Office action from Finnish Patent and Registration office regarding corresponding application FI20215118. Dated Jan. 9, 2024. 7p.

(Continued)

*Primary Examiner* — Chinyere J Rushing-Tucker
(74) *Attorney, Agent, or Firm* — N.V. Nederlandsch Octrooibureau

(57) ABSTRACT

The invention relates to a method for tagging (101) products or product packages by applying hot-melt adhesive (103) to removably or permanently attach (104) a remote-readable tag (202) with an identification element (102) onto the product or product package. Hot-melt adhesive is targeted as a shot onto a surface of the product or product package. Hot-melt adhesive removes moisture and/or layer of ice from the surface of the product or product package thereby facilitating removable or permanent attachment (104) of the remote-readable tag (102) onto the product or the product package. A corresponding product or product package tagged according to the method is presented.

6 Claims, 2 Drawing Sheets

(56) References Cited

U.S. PATENT DOCUMENTS

2009/0117312 A1    5/2009   Hanelt et al.
2011/0126979 A1*   6/2011   Ambartsoumian ... B29C 66/472
                                                                                  156/322
2012/0126008 A1    5/2012   Binmore et al.

FOREIGN PATENT DOCUMENTS

EP          3190064 A1    7/2017
EP          3640853 A1    4/2020
WO       03012735 A1    2/2003

OTHER PUBLICATIONS

International Search Report and Written Opinion in Application No. PCT/FI2022/050061, mailed May 17, 2022, 9 pages.
Finnish Search Report in U.S. Appl. No. 20/215,118, dated Sep. 3, 2021, 2 pages.
Finnish Office Action in U.S. Appl. No. 20/215,118, dated Sep. 3, 2021, 2 pages.

\* cited by examiner

METHOD FOR TAGGING PRODUCTS AND A PRODUCT

CROSS-REFERENCES

This application is a U.S. national stage application of international application PCT/FI2022/050061 filed on Feb. 1, 2022 and claiming priority to Finnish national application FI20215118 filed on Feb. 4, 2021.

FIELD OF THE INVENTION

Generally, the present invention relates to tagging and tracking of products. Especially, however not exclusively, the present invention concerns the utilization of wirelessly readable tags provided with the products and the product packages.

BACKGROUND

Attaching identification tags to products is usually done by attaching an adhesive label or a sticker with a tag to the consumer product packages. This commonly includes a manual labor phase where adhesive labels with tags are attached to the consumer product packages.

Products and goods may be tagged with remote readable identification elements for example in order to follow their location, route and/or temperature. If the requirement is for a single tag or a few stock keeping units (SKUs) to be tagged, the tagging can be executed on a source tagging principle. In the source tagging the manufacturer tags the packages already at the packaging line. This is an advantageous solution for tagging large volumes and simple tagging. Therefore, this kind of source tagging is commonly used only in circumstances where one SKU is tagged for millions of times. In situations where several, even hundreds, of SKU products are tagged, however, the tagging is typically manual labor. This makes tagging resource intensive and time consuming Several automated, for example robot-based, solutions are being developed around the world in order to enable automatic or semi-automatic adhesive label tagging.

One, and often related, problem arises from the design and installation of the tags themselves. Tags such as radio frequency tags are typically mass manufactured/bulk items that are directly produced onto the end-product or packaging a thereof or attached thereto in the format of a separate label with a securing adhesive, like a sticker. Their configuration, considering e.g., size, shape, used technology (supported interrogation method and related parameters), alignment/positioning, and included components/materials, is of generally recognized type, which is practically never optimized to any particular use case or use scenario involving a certain type of host item, which may refer to a solid product, fluid in an impermeable contained such as a plastic or glass bottle, product packaging made of e.g., cardboard, etc. Various properties such as electrical conductivity, temperature, shape, and surface roughness of the host item may therefore vary considerably, and variance may occur even within a single item that may be of heterogeneous construction. Accordingly, similar items kept at different temperatures may have different surface properties due to, for example, condensation of water and formation of ice on cold surfaces.

It may be that generic wet inlay tags, or sticker tags, attach poorly or insufficiently to the product or the product package surface, especially if the surface is covered, for example, with moisture or ice. In some environments during transportation, storage and e.g., sales the products may be subjected to conditions that impose additional stress and wear to the tag in terms of physical or chemical strain (impacts, rubbing, moisture, etc.), which may damage or detach the tag.

Currently, no one solution exists to tag several different packaging forms, such as, for example, cardboard packages, plastic packages, wrappings, bottles, and cans. Even more significant issue in product tagging is the tagging of cold or frozen products. Because the surface of the cold or frozen product is covered with moist or crystalline ice, there is an adhesion problem while attempting to attach the adhesive label tag. This is a generally recognized problem in tagging industry, including RFID (radio frequency identification) tagging industry.

SUMMARY

The present approach solves or at least alleviates the problem of tagging multiform products or (product) packages, especially solving or alleviating the problem of tagging e.g., cold, or frozen products or packages. It further solves or alleviates the problem of tagging packages with a moist surface. It further solves or alleviates the problem of tagging packages with a rough or poor surface structure. It even further solves or alleviates the problem of tagging fragile products or packages. Thereby, it offers a fast and efficient method to label diverse products or their packages. The approach greatly expands the utilization of wirelessly readable tags provided with the products or the product packages.

Main features of the present invention are described in independent claims. A preferred realization of the invention is described in the dependent claims.

Tags have either wet or dry inlay. Dry inlay tag does not have an adhesive, such as a glue, in the back side of the tag. Wet inlay tag, on the other hand, has an adhesive in the back side of the tag. Apparel and footwear industries are the only ones significantly using dry inlay tags.

According to an aspect of the invention a tag is attached using a hot-melt/hot-setting/hot-sealing adhesive. Both wet and dry inlay tags may be used according to the application. In general, dry inlay tags are often easier and more practical to manufacture and thereby more efficient to use. It may be beneficial for the handling of the tags if they do not have adhesive surfaces. Wet inlay or similar adhesive surfaces may cause undesirable attachment of the tags into, for example, the tagging apparatus.

According to an embodiment of the invention, the hot-melt adhesive can be one-time curing. Alternatively, the adhesive can be continuously thermally responsive and thus re-curable based on temperature. The temperature may be in the range of 50-250° C., preferably in the range of 140-220° C. The hot-melt adhesive can be painted, pasted, brushed, spread, or shot to the product surface, product package surface, or tag inlay. In one preferable arrangement, the hot-melt adhesive can be a shot as a droplet targeted onto the product or the product package surface. This shooting may preferably be performed just prior to the attachment of the tag, or at least within the curing time of the hot-melt adhesive. Such tag attachment is rapid and can be done with minimal application pressure, such as 500-200000 Pa. This may be estimated to account for 5 g to 2 kg per square centimeter. This application pressure is significantly lower than the application pressure (150000-600000 Pa) in the traditional wet inlay tag attachment and requires only narrow area pressure not covering whole dry inlay area. Furthermore, hot-melt tagging can conform to uneven surfaces. The reduction of application pressure expands the usability range of tagging into objects, shapes, products, and product packages that cannot be put under pressure due to their fragility.

According to an embodiment of the invention using a hot-melt adhesive efficiently removes the moisture and/or thin ice layer from the surface of the product or product package. This rapid heat treatment does not damage the product or the product packaging, but the heat associated evaporation of water causes drying of the product or the product package surface. The drying of the product or the product package surface improves adhesion. With packaged frozen goods, for example, the hot-melt adhesive removes the thin layer of ice from the surface of the package and forms an adhesion to the surface of the package. Right after this, a tag may be pressed into the still adherent hot-melt adhesive. The hot-melt adhesive can be applied by a robot or any automated arrangement. Similarly, an automated arrangement can be arranged to press the tag into the still adherent hot-melt adhesive. In addition to this, the hot-melt adhesive placed between the tag and the surface of the package may increase the distance between the antenna and surface of the package and enable RF performance (such as reading range) to be improved. This can be for example due to the change of dielectric properties when a small air gap is introduced in between.

A rough surface of the product packaging that is difficult to label with wet inlay due to small surface to adhesive ratio. According to an embodiment of the invention a hot-melt adhesive can be a shot targeted onto the product surface just prior to the attachment of the tag, increase the surface to adhesive ratio, and enable subsequent tagging.

According to an embodiment of the invention a surface of a product package or the product itself may have a weak surface that cannot withstand traditional wet inlay label adhesive tagging involving pressure to ensure proper and sufficient adhesion of the tag. A hot-melt adhesive can be a shot targeted onto the product surface just prior to the attachment of the tag causing little or no pressure to the product or product package. Similarly, pressing of the tag into adherent hot-melt adhesive requires minimal pressure (500-200000 Pa). This enables the tagging of the product packages or the products themself with a weak or fragile surface.

According to an aspect of the invention, a product or a product package tagged with a remote-readable (product) identification element, which stores remotely readable identification information, such as at least one product (class, type, etc.) and/or product instance-specific identification information element (e.g., a serial number or other identifier uniquely identifying the particular instance of the product, i.e. individual product item), may be realized according to the method described above.

According to a preferential aspect of the invention, multiform products or product packages are tagged by applying hot-melt adhesive to removably or permanently attach a remote-readable tag with an identification element onto a product or a product package. An RFID tag is used as the remote-readable tag with the identification element. The hot-melt adhesive is applied as a shot targeted onto a surface of the product, the product package, or a tag inlay. The hot-melt adhesive is applied to remove moisture and/or layer of ice from the surface of the product or the product package. The remote-readable tag with the identification element is placed on top of the product or the product package surface area at least partially covered by the hot-melt adhesive. An application pressure of 5000-200000 Pa is applied to removably or permanently attach the remote-readable identification element onto the product or the product package.

According to a preferential aspect of the invention, Multiform product or product package may be tagged with a remote-readable identification element.

According to a preferential aspect of the invention, an arrangement for tagging multiform product or product package comprises a product handling element, an adhesive provision element, and a tag attaching element. The product handling element is configured to subject a product or a product package to tagging. The adhesive provision element is configured to apply hot-melt adhesive onto the product or the product package surface. The tag attaching element is configured to attach a tag with a remote-readable identification element onto the hot-melt adhesive applied onto the product or the product package surface.

In this application tagging refers to labelling or marking something for the purpose of identification. A tag may therefore indeed include an identification element that stores related identification information such as at least one code or other information element. Tag attachment onto the surface of a host item may refer to a surface of the target product itself or e.g., associated product package.

In this application labels may be referred as surfaces. The term "sticker" may be referred as surfaces with wet inlay. The term may also refer to a label with an adhesive back side or layer.

The term "product" may generally refer herein to any concrete durable product or consumable product, related packaging or package, container, tray, mallet, can/bottle, or other means of transportation, protection, storage, marketing, or sales, provided with or forming an integral or removable part of the product. The term may also refer to aggregate element, such as a blister pack or mallet, potentially accommodating a plurality of mutually similar or different product units such as pills.

BRIEF DESCRIPTION OF THE DRAWINGS

Next the present invention will be described in greater detail with reference to the accompanying drawings, in which.

DETAILED DESCRIPTION

Figure 1:
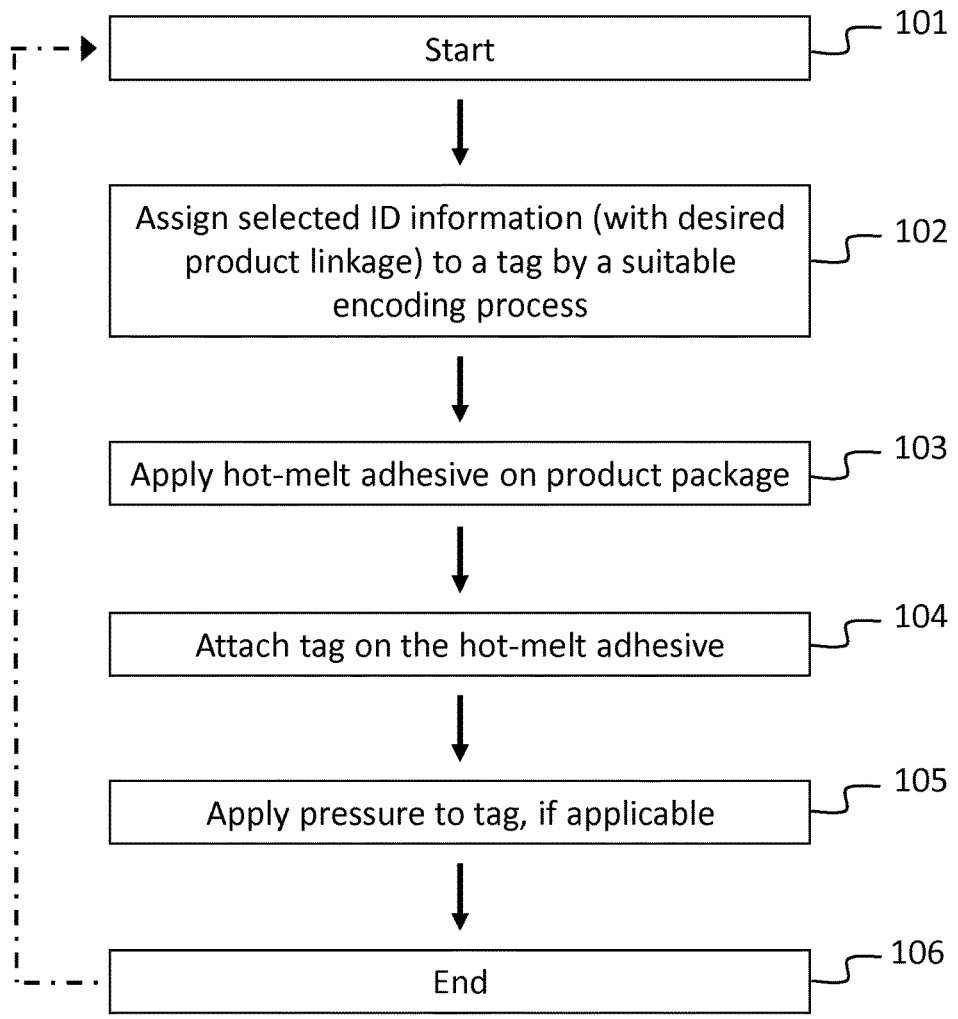
FIG. 1 is a flow diagram disclosing an embodiment of a method in accordance with the present invention.

FIG. 1 provides one viewpoint to an embodiment of a method of the present invention and exemplifies a related potential use scenario involving a start position 101, where products (items) or product packages are provided having a surface that may be difficult or impossible to tag with traditional wet inlay or sticker tags. Such product or product package may be, but is not limited to, at least one of the following, cold, or frozen, fragile or possess rough surface.

A tag is provided with an identification element that hosts remotely readable identification (ID) information, preferably comprising at least product ID information, written (encoded) therein. The assigned ID information of the tag is preferably associated with the product and/or specific instance of the product to be tagged. Linkage between the ID information and the product (and optionally even the individual product item/instance) may also be stored in an external database or other preferably digital data repository. Assigning the information may involve executing an appropriately selected encoding process compatible with identification element of the tag 102. In various embodiments, an identification element commonly includes at least one electrical or specifically electronic element such as an integrated circuit (chip). This circuit allows the identification element to have memory capacity for storing data such as product ID information and limited processing and/or controlling capabilities. The chip may be manufactured by means of printed electronics or traditional surface or substrate deposition methods.

The integrated circuit/memory of the identification element may be (re-)programmable or (re-)writable. The integrated circuit/memory of the identification element may, on the other hand, be read-only. The readable identification information of the identification element may include a serial number, such as Tag identifier, product code, an organization/company code, manufacturer information, or information related to the handling and surroundings of the product and its identification element. Handling and surroundings related data may include, but are not limited to temperature, humidity and package opening information. The identification element may be pre-set or coded on site.

According to an embodiment, the product information may be read from the identification element 102 of a product or a product package. The product information may be read optically or electromagnetically.

The identification element with one or more integrated circuits and related communication may be based on Bluetooth, wireless local area network (WLAN), infrared, near infrared, radio frequencies (preferably LF, HF, UHF or SHF spectrum operable), GPS signals, near field communication, or other similar wireless solutions.

According to another embodiment, the identification element may be or comprise a plain printed element, such as, but not limited to, printed name element, scannable barcode, or QR-code.

Figure 2:
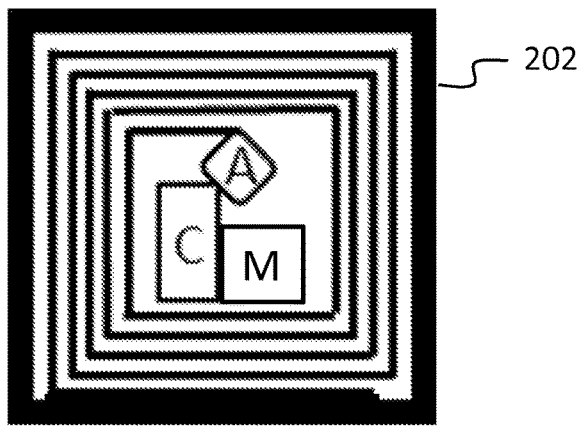
FIG. 2 illustrates an embodiment of a tag of the present invention.

FIG. 2 illustrates an embodiment of a tag 202 of the present invention. It includes an identification element with at least functionally separable constituent elements such as a memory M, a controller C (e.g., microcontroller, processor or application-specific circuit, ASIC), and/or an antenna A or other remote reading and/or writing enabling means, for a remotely, such as electromagnetically or optically, readable code, or generally, (product) identification information. Electromagnetic code may be e.g., RF or Bluetooth readable.

The code may be programmed (encoded) in a silicon chip such as an integrated circuit, made from semiconductor materials such as silicon, optionally combining several shown elements, such as both the M and the C of the FIG. 2, in the same chip. The tag 202 may be an RFID tag. Optically readable code may comprise or define an alphanumeric or a graphical identification element. Optically readable code may be, for example, a QR code or a datamatrix code.

Antenna A may be produced by printed electronics technology (e.g., screen printing or ink jetting), for example, or by other traditional methods, like etching and cutting.

In response to e.g., an external interrogation signal optionally also powering the tag 202, the controller C may be then configured to output (transmit) the code stored in the memory M via antenna A. In some embodiments, the tag 202 may further include an internal power source such as a battery (not shown).

The surface or substrate of the tag hosting the identification element may contain or substantially consist of for example paper, cardboard, wood or other organic and/or fibrous material, fabric/textile material, plastic sheet or film, glass, etc. The tag is preferably a dry inlay tag, but also a wet inlay tag may be used.

A hot-melt adhesive is applied on the product package 103. The hot-melt adhesive may be a hot glue. The hot-melt adhesive may be either single use or removable/repeatedly usable adhesive. Single use adhesives are commonly used for antitampering purposes because they cannot be removed by re-heating. Removable adhesives are commonly used in situations where reuse, detaching, or replacement are relevant.

Hot-melt adhesives may consist of base material and additives. Base materials include, but are not limited to, ethylene-vinyl acetate, polyolefins, polyamides, polyesters, polyurethanes, styrene block copolymers, polycaprolactone, polycarbonates, fluoropolymers, silicone rubbers, thermoplastic elastomers, polypyrrole. Additives may include, but are not limited to, antioxidants, antistatic agents, plasticizers, stabilizers, pigments, dyes, glitter, biocides, flame retardants, waxes, tackifiers, and fillers. Fillers are used, for example, to add bulk, to form an aggregate-matrix composite material, and also to alter the properties of the hot-melt adhesive. Different source materials change the properties of the resulting hot-melt adhesive. For example, low melting point hot-melt adhesives create stronger bonds. Therefore, different hot-melt adhesives may be used for different materials or to obtain desired properties for the given application.

The hot-melt adhesive may be be painted, pasted, brushed, spread, or shot to the surface of the product surface, the product package, or the tag inlay. Preferentially, the hot-melt adhesive may be applied as droplets or as droplets shot onto the product package surface. Single droplet size diameter range may be about 0.5-10 mm, preferably about 2-5 mm. When applying the hot-melt adhesive by shooting using a selected tool, the droplets may be produced using, for example, MiniBlue II SureBead™ nozzles with orifice sizes of about 0.008, 0.012, 0.016, 0.020, 0.032, or 0.040 (US, inches), selection of the nozzle size being dependent on the selected hot-melt adhesive, the tag size, and the product size.

Hot-melt adhesive may be applied with a glue gun, for example hot melt dispensing applicator that operates with air or gas pressure. Alternatively, a glue gun operating with electro-acoustic or magnetic pulsation may be used instead of air pressure to apply the hot-melt adhesive. Glue gun may be a hand-held glue gun. The shooting may be performed by an automated system. Right after applying the hot-melt adhesive, the tag with the identification element is placed on top of the product package surface area at least partially covered by the hot-melt adhesive 104.

According to an embodiment using a hot-melt adhesive efficiently removes moisture from the surface of the product or the product package. This rapid heat treatment does not damage the product or its packaging, but the heat associated evaporation of water causes drying of the surface. The drying of the surface improves adhesion. The hot-melt adhesive temporarily heats and dries a small portion of the moist product or product package surface 103. Therefore, subsequent application of the tag with the identification element onto the hot-melt adhesive covered portion of the product or the product package will enable attachment of the tag onto the product or the product package surface 104.

According to an embodiment using a hot-melt adhesive efficiently removes thin ice layer from the surface of the product or the product package. This rapid heat treatment does not damage the product or its packaging, but the heat associated evaporation of water causes the product or the product package surface to dry. The drying of the product or the product package surface improves adhesion. The hot-melt adhesive temporarily heats and dries a small portion of the frozen product package surface 103. Therefore, subsequent application of the tag with the identification element 102 onto the hot-melt adhesive covered portion of the product or the product package will enable attachment of the tag onto the product or the product package surface 104.

According to another embodiment the hot-melt adhesive is arranged on a rough surface, that is a surface with small surface to adhesive ratio. The hot-melt adhesive creates a smooth surface spot on a small portion of the rough product or product package surface 103. Therefore, subsequent application of the tag with the identification element 102 onto the hot-melt adhesive covered portion of the product or the product package will enable attachment of the tag onto the product or the product package surface 104.

According to another embodiment the hot-melt adhesive arranged on a fragile surface of the product, or the product package enables a subsequent application of the tag with the identification element onto the hot-melt adhesive covered portion of the product or the product package attaching the tag onto the product or the product package surface 104. The tag may be placed onto the hot-melt adhesive covered portion of the fragile product or the fragile product package 105 with very low pressure, for example 1000-10000 Pa.

Because the hot-melt adhesive is not rigid while warm, but rather a paste, the amount of pressure needed to firmly attach the tag onto the product, or the product package surface is minimal 105. The tags may even be placed onto the hot-melt adhesive covered portion of the product or the product package with low pressure, for example due to very fragile product or product package 105. Tagged products or product packages 106 may be further packed onto larger units or, for example, forwarded to, logistic companies, distributors, retailers, users/end-customers, and/or end-of-life businesses.

At 106, method execution is ended. The dotted loop-back arrow reflects the likely repetitive nature of the execution of various method items as being easily understood by a person skilled in the art.

Figure 3:
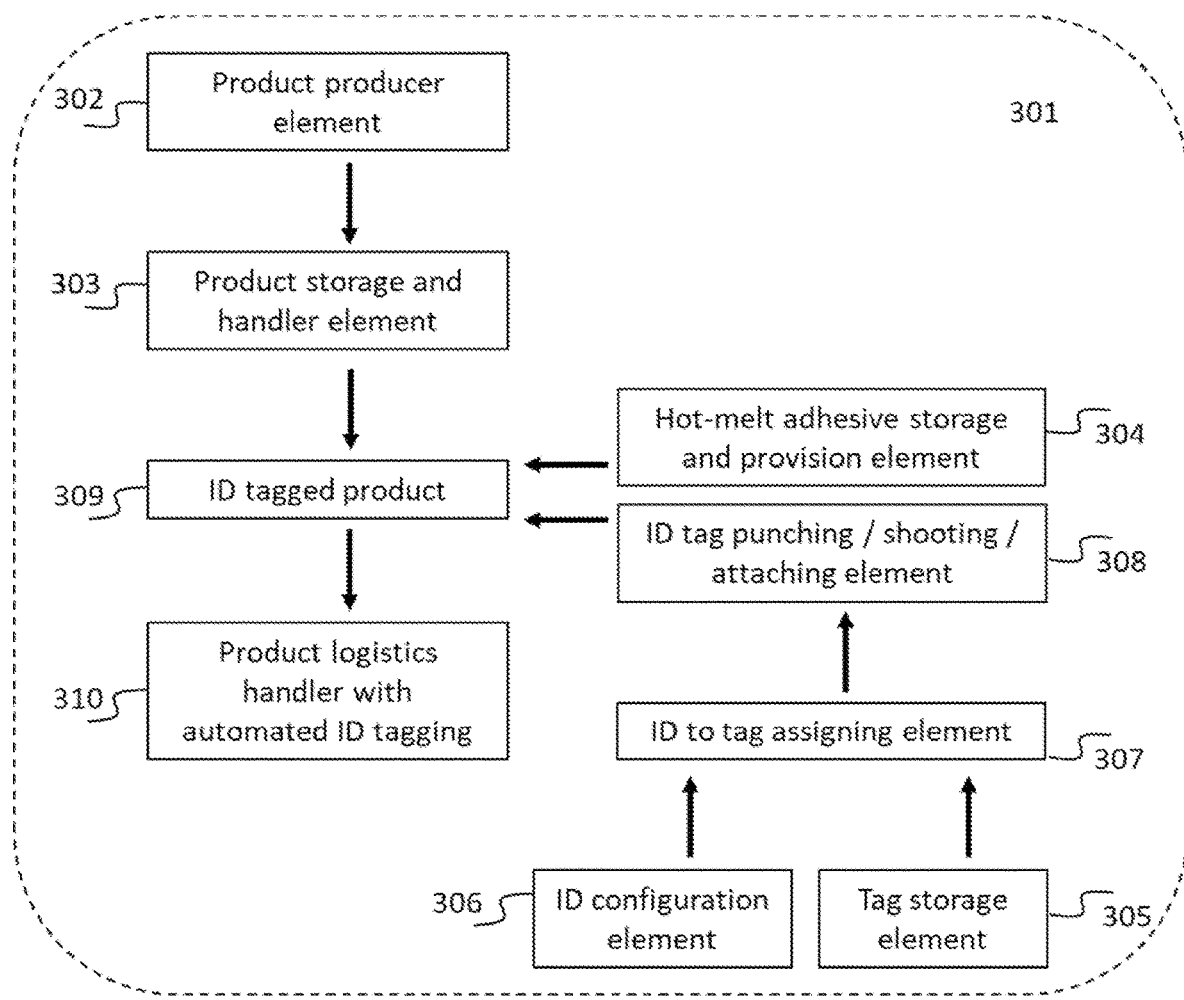
FIG. 3 illustrates preferably at least partially automated arrangement for carrying at least part of the method.

FIG. 3 illustrates preferably at least partially automated arrangement 301 for carrying at least part of the method. The arrangement may comprise a device or a system of at least functionally connected devices. For instance, robotics and industrial automation may be applied for product, tag, and adhesive handling in the context of the present invention in general. Products may be produced by the product producing element 302. Products may be stored and handled by the product storage and handler element 303. The handling may include subjecting the products to a tagging procedure. Hot-melt adhesive may be storage and supplied by hot-melt adhesive storage and provision element 304. Supplying hot-melt adhesive may include applying hot-melt adhesive to the product surface. Tag(s) 202 may be stored by the tag storage element 305. ID (information) configuration may be executed by the ID configuration element 306, which may include e.g., a data processing unit and memory (e.g., database). Subsequently, ID information such as product ID information may be assigned to the tag by the ID to tag assignment element 307. Hot-melt adhesive may be provisioned onto the surface of the product after which the tag 202 may be attached to the product, for example by pasting, punching, or shooting equipment 308. As at least a partial result of the method is an ID information tagged product 309 that may be further handled in logistics or other part of the supply chain 310.

The invention claimed is:

1. A method for tagging moist, cold, or frozen multiform products or product packages, the method comprising:
    applying a hot-melt adhesive onto either a product surface or a product package surface, wherein the hot-melt adhesive removes moisture or a layer of ice from the product surface or the product package surface,
    while the hot-melt adhesive is still adherent, placing a remote-readable tag with an identification element on the hot-melt adhesive, and
    applying a pressure in a range of from 500 to 200000 Pa to attach the remote-readable tag onto the product surface or the product package surface,
    wherein the remote-readable tag is a radio frequency identification (RFID) tag, and
    the hot-melt adhesive is applied as a shot targeted onto the product surface or the product package surface.

2. The method of claim 1, wherein applying the hot-melt adhesive as a shot targeted onto the product surface or the product package surface increases a surface-to-adhesive ratio of the product surface or the product package surface.

3. The method of claim 1, wherein the remote-readable tag is a dry inlay tag.

4. A moist, cold, or frozen multiform product or product package tagged with a remote-readable identification element according to the method of claim 1.

5. An automated arrangement for tagging moist, cold, or frozen multiform products or product packages, the automated arrangement comprising:
    a product handling element configured to subject a product surface or a product package surface to tagging,
    an adhesive provision element configured to apply a hot-melt adhesive onto the product surface or the product package surface, wherein the hot-melt adhesive removes moisture and/or a layer of ice from the product surface or the product package surface, and
    a tag attaching element configured to place a remote-readable tag with an identification element onto the hot-melt adhesive while the hot-melt adhesive is still adherent and to apply a pressure in a range of from 500 to 200000 Pa to attach the remote-readable tag onto the product surface or the product package surface,
    wherein the remote-readable tag is a radio frequency identification (RFID) tag, and
    the tag attaching element comprises shooting equipment configured to apply the hot-melt adhesive as a shot targeted onto the product surface or the product package surface.

6. The arrangement of claim 5, wherein the adhesive provision element comprises a glue gun that operates with one of: air pressure, electro-acoustic pulsation, or magnetic pulsation.

* * * * *